United States Patent
Schempp

(10) Patent No.: US 7,427,164 B2
(45) Date of Patent: Sep. 23, 2008

(54) OPTICAL CONNECTOR ARRANGEMENT COMPRISING A CONVERTER

(75) Inventor: Otto Schempp, Bad Rappenau (DE)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/628,186

(22) PCT Filed: Jun. 2, 2005

(86) PCT No.: PCT/EP2005/005942

§ 371 (c)(1),
(2), (4) Date: Jun. 21, 2007

(87) PCT Pub. No.: WO2005/119320

PCT Pub. Date: Dec. 15, 2005

(65) Prior Publication Data

US 2007/0237461 A1    Oct. 11, 2007

(30) Foreign Application Priority Data

Jun. 2, 2004    (DE) .................. 10 2004 027 034

(51) Int. Cl.
*G02B 6/36*    (2006.01)

(52) U.S. Cl. ............... 385/53; 385/56; 385/60; 385/76; 385/77; 385/78; 385/88; 385/89; 385/92; 385/93; 385/94; 398/22; 398/23; 398/24; 398/139; 398/141

(58) Field of Classification Search ............ 385/53–94; 398/22–24, 139, 141
See application file for complete search history.

(56) References Cited

U.S. PATENT DOCUMENTS 4,427,879 A * 1/1984 Becher et al. ............... 250/215
4,690,492 A * 9/1987 Beard .......................... 385/89
4,736,100 A   4/1988 Vastagh
4,798,440 A * 1/1989 Hoffer et al. .................. 385/89
5,243,678 A   9/1993 Schaffer et al.
5,647,042 A   7/1997 Ochiai et al.

(Continued)

FOREIGN PATENT DOCUMENTS

EP    0969300 A2    1/2000

(Continued)

OTHER PUBLICATIONS

"Optical Data Links for Automotive Applications" By: Thomas Kibler & Eberhard Zeeb Referenced from: 0-7803-8365-6/04IEEE 2004 Electronic Components &Tech. Conf. pp. 1360-1370.

*Primary Examiner*—Brian Healy
*Assistant Examiner*—Hung Lam

(57) ABSTRACT

The invention relates to an optical connector arrangement wherein the connector and the converter are connected by short plastic fiber sections. The aim of the invention is to provide one such connector arrangement which can be produced in a simple and cost-effective manner, can be easily and economically mounted on a circuit carrier and reliably and efficiently soldered to the conductors thereof, enables a modular assembly, and is at least partially heat-resistant during the assembly in such a way that, for example, a vibration-resistant reflow soldering can be carried out. To this end, the fiber sections are connected to a double ferrule which is fixed to the converters by means of a clamp. A false cover can be used for the transport and soldering.

21 Claims, 8 Drawing Sheets

U.S. PATENT DOCUMENTS

| | | | |
|---|---|---|---|
| 6,334,716 B1 * | 1/2002 | Ojima et al. | 385/89 |
| 7,004,643 B1 * | 2/2006 | Johnson et al. | 385/88 |
| 2002/0001437 A1 | 1/2002 | Yamaguchi | |
| 2007/0248304 A1 * | 10/2007 | Schempp | 385/59 |

FOREIGN PATENT DOCUMENTS

| | | |
|---|---|---|
| WO | WO 2004/031817 A | 4/2004 |

* cited by examiner

OPTICAL CONNECTOR ARRANGEMENT COMPRISING A CONVERTER

CROSS-REFERENCE TO RELATED APPLICATIONS

This application is a continuation application of PCT/EP05/05942, filed Jun. 2, 2005, which is based upon and claims the benefit of priority from Germany Patent Application No. 10 2004 027 034.1, filed Jun. 2, 2004.

FIELD OF THE INVENTION

The invention relates to an optical connector assembly, to its modules and to a method for mounting and soldering the connector assembly on a circuit board in general, and to an optical connector assembly for production of multimedia connections in a motor vehicle, having an optical connector and optical components which, in particular, are connected to one another by means of optical fiber lengths.

BACKGROUND TO THE INVENTION

Owing to the increasing complexity of applications in the field of motor-vehicle information electronics, which can now be referred to as being multimedia, new concepts have become necessary for the networking of different appliances.

For example, it should be possible for at least the car radio, mobile telephone and navigation system to communicate bidirectionally with one another so that, for example, the reproduction of music by the car radio can be muted and the mobile radio link can be operated via the radio loudspeaker when the user wishes to make a telephone call. However, this is obviously only a very simple application and the multimedia network of on-board electronics is subject to virtually no limits in order to satisfy the customer demand.

In order to satisfy the complex requirements, optical data transmission is being introduced for these connections in the automobile field. In this context, a new standard called MOST® has been developed for this purpose. The specifications for the MOST® standard have been published as the "MAMAC Specification" Rev 1.0, November 2002, Version 1.0-00 at http://www.mostnet.de/downloads/Specifications/MAMACSpecification_1V0-00.pdf and at http://www.mostnet.de/downloads/Specifications/MOST%20Physical%20Layer%20Specification/010223 WgPhy Drawings.zip. Reference is hereby made to the abovementioned specifications, and their entire content is included by reference in the subject matter of this disclosure.

Optical MOST® connector assemblies are designed for the connection of at least two optical waveguides and typically have an optical connector for connection to a corresponding mating connection, and two electrooptical transducers. In one frequently used type of MOST® connector assembly, the transducers are not integrated in the connector housing or fitted directly to it, but are at a distance from it, even though the connector and the transducer are typically soldered on the same circuit board. The connector and the transducer in this embodiment are optically connected to one another by short optical plastic fiber lengths, which are sometimes also referred to in specialist jargon as pigtails.

This physical separation of the connector and of the transducer is used, inter alia, for decoupling, but results in a wide range of problems.

First of all, the fiber lengths are normally attached to the transducers individually. For this purpose, the fiber lengths typically have bayonet-like fittings, for example known "BNC connectors". However, these are really small and are thus complex to produce, are sensitive, and are difficult to handle. Furthermore, each fiber section must disadvantageously be attached individually with a combined pushing and turning movement.

Furthermore, in the case of automotive applications, there is a requirement for good resistance to vibration, which these bayonet fittings do not adequately comply with. On the contrary, in some circumstances, they have a tendency to become loose when subject to vibration.

In order to avoid this problem, attempts have been made to secure the bayonet fittings against shaking loose by means of an adhesive. Once again, however, this results in a large number of other problems.

Specifically, if the arrangement is delivered ready-assembled to the customer, for example a car electronics manufacturer and if the bayonet fittings are appropriately secured, the plastic fiber lengths are located on the transducers during soldering, and this can lead to an adverse effect on the adhesive bonding on the fibers, because of the heat that is introduced. If, on the other hand, the arrangement is delivered individually, the customer has to deal with the difficulties of connection of the fibers. Apart from this, there is no assurance that the adhesives will last for many years, to many decades, in the severe operational conditions in the automobile field.

Furthermore, adhesively bonded arrangements such as these result in maintenance difficulties.

Bearing in mind the enormous competitive pressure in this market, this situation is undesirable. It is therefore surprising that it has not yet been possible to find any satisfactory solution.

The aim of the invention, in particular, is accordingly to improve the connector assemblies of the type mentioned above, and to overcome the disadvantages mentioned above.

An optical link module is known from U.S. Pat. No. 5,647,042 (Ochiai et al.) wherein a standard optical fiber connector is connected to an optoelectronic conversion means via a single optical fiber and a coupling means. The connection is by a metal plate spring. This system appears to be a too sensitive one and a too costly one for automotive applications. Furthermore, Ochiai et al. starts from a coupling means for an optical fiber and does not suggest an amended fixation of a pair of pig-tails to a pair of transducers.

General Description of the Invention

One object of the invention is thus to provide an optical connector arrangement, in particular for establishing multimedia connections in a motor vehicle, comprising an optical connector, at least two electrooptical/optoelectrical transducers arranged in pairs and installed at a distance from the connector, and optical fiber lengths (pigtails) for spaced connection of the connector and of the transducers, which is improved in terms of the attachment of the two fiber lengths to the two transducers and can be produced easily and at low cost.

A further object of the invention is to provide a connector arrangement of the kind referred to above which can be mounted easily and at low cost on a circuit board, and can be reliability and efficiently soldered to its conductors.

Another object of the invention is to provide a connector arrangement of the kind referred-to above which allows intermeshing process steps at the manufacturer and at the customer of the connector arrangement.

Yet another object of the invention is to provide a connector arrangement of the kind referred to above which allows modular assembly and is heat-resistant at least at times during assembly so as to enable reflow soldering, for example.

Yet another object of the invention is to provide a connector assembly of the kind referred to above which ensures a good optical connection between the components and a reliable attachment, which is in particular vibration-resistant and heat-resistant, of the fiber lengths to the components.

Yet another object of the invention is to provide a simple method for mounting and soldering of a connector assembly of the kind referred to above.

The object of the invention is achieved in a surprisingly simple manner just by the subject matter of the independent claims. Advantageous developments of the invention are defined in the dependent claims.

According to the invention, in particular, an optical connector assembly is proposed for making signal connections, which has an optical connector for connection to a complementary mating connector, in particular according to the MOST® standard, at least one first and second optical or electrooptical component, which are combined to form a component group arranged alongside one another, and which are at a distance from the connector, at least one first and second optical fiber section, at least one attachment means for detachable attachment of the two fiber lengths to the component assembly, and a common fiber carrier for the two fiber lengths.

The electrooptical components are, in particular, electrooptical or optoelectrical transducers, so-called fiber-optic transceivers, or FOT for short, in this field of connector technology.

On the one hand, the first and second optical fiber lengths are connected by their first ends to the optical connector.

On the other hand, the fiber lengths are plugged by their second ends onto the FOTs and are then secured by an attachment means. The attachment means in this case acts in particular on the common fiber carrier and forms a detachable clamping attachment between the component group or the first and second optical component on the one hand, and the common fiber carrier or the first and second fiber section on the other hand.

The first fiber section thus produces a first optical signal connection between the optical connector and the first optical component, and the second fiber section thus produces a second optical signal connection between the optical connector and the second optical component, when the first and second fiber lengths are connected respectively to the first and second optical components on the one hand and to the optical connector on the other hand. The two fiber lengths are represented by short pieces of optical plastic fibers (plastic optical fibers, POF).

According to the invention, the two plastic fiber lengths ("pigtails") together with the common fiber carrier preferably form a fixed and/or permanently connected unit, which in this case is referred to as an optical fiber arrangement and can be connected as an entity to the two FOTs or to the component group. This considerably simplifies the handling and the fitting in comparison to individual fitting of the fiber lengths, as in the case of the connector assembly initially with bayonet fittings.

The common fiber carrier can also be regarded as a double ferrule by means of which the two fiber lengths can be permanently connected, and at the same time can be detachably connected to the FOTs as a unit and can be detachably connected to them.

The double ferrule is preferably adhesively bonded or welded to the two fiber lengths, or the fiber lengths are directly extrusion coated with the double ferrule. This type of connection is long-lasting and can be produced at low cost at the same time.

The common fiber carrier is preferably produced integrally, for example from plastic, easily and efficiently.

This preferred embodiment results in the invention being very particularly advantageous in comparison to the techniques described initially. This is because the proposed attachment of the fiber lengths according to the invention allows the two FOTs, which are typically arranged in a common metal surrounding housing, to be fitted and soldered on the circuit board without the fiber lengths. These are then connected to the FOTs only after soldering, and can nevertheless be reliably and easily attached. Thus, in particular, the sensitive plastic fibers are not subject to the high temperatures, for example, during reflow soldering.

According to one preferred embodiment of the invention, the common fiber carrier has a first and a second ferrule portion, which surrounds the respective first or second fiber section as well as a plate-like body section with a rear face which forms a stop for the component group. The body section is, furthermore, preferably flat and extends on a lateral plane transversely with respect to the longitudinal axis of the fiber lengths, and the two sleeve sections project on both sides transversely with respect to the plane from the body section.

Each longitudinally extending and essentially cylindrical sleeve section thus carries out the function of a ferrule for the plastic fiber, with a double function. Firstly, a guide bead ensures precise centering of the fibers with respect to the optical connection to the FOTs. Secondly, kinking protection is provided for the fiber lengths on the front face of the body section, facing away from the FOTs.

The attachment means is preferably in the form of a resilient metallic clamping clip. This can be produced particularly easily by stamping and forming and, in this case, is typically formed integrally.

The clip is accordingly in the form of a leaf spring and preferably has an essentially U-shaped cross section. When fitted, the clip clasps the optical components and the common fiber carrier, in order to attach them to one another. Furthermore, the clip is designed such that it is subject to stress when fitted, and force is applied to the two fiber lengths against the two optical components.

The clip preferably has at least three limbs, specifically one front limb as well as one first and second rear limb. The latter are laterally separated from one another by a recess located in between them. The central front limb thus acts centrally on the common fiber carrier between the two fiber lengths, and each rear limb is associated with a respective one of the FOTs and applies force to it or to the surrounding housing laterally, for example in the area of the optical connection, so that the forces which are exerted by the clip are applied at the correct point, and torques are avoided.

With respect to the commercially available FOTs, it has been found that the clip, to be more precise its two rear limbs when fitted, can preferably act either externally on the surrounding housing of the FOTs or can be inserted into an opening in the surrounding housing and make a direct contact with the optical components, depending on the FOT manufacturer. The clip in this case preferably has a width of 5 mm to 20 mm, and an unobstructed internal width of 3 mm to 10 mm.

For precise guidance of the clip, the fiber carrier preferably has a guide groove which is arranged between the fiber lengths and is bounded by two side walls. The shape of the guide groove is matched to the shape of the front limb of the clip. The guide groove and the front limb preferably each taper, thus making it easier to insert them or push them in.

Furthermore, the clip, or to be more precise the front limb, preferably has a latching projection which points inwards, and the fiber carrier has a complementary depression, for example a hole, so that the clip latches with the fiber carrier when fitted. This ensures simple fitting and removal, while at the same time being sufficiently resistant to vibration.

A blank cover is preferably also provided for fitting, as protection for the optical connections of the FOTs.

The invention results in particular advantages with regard to fitting and user friendliness, as follows.

By way of example, the connector manufacturer supplies the arrangement in a state in which the arrangement is in the form of three modules, which are preferably separated from one another in the delivery state.

1) the connector, 2) the double-fiber assembly and 3) the component assembly with a blank cover and the clip. The component group is initially assembled to the extent that the two FOTs are arranged in the surrounding housing, and the optical connections of the FOTs are closed, to be essentially dust-tight, by the blank cover. In this delivery state or intermediate state, the blank cover is preferably attached to the component group by the same clip that will later be used for the fiber carrier. The arrangement comprising electrooptical components, the surrounding housing, the blank cover and the attachment means is referred to in this document as a mounting arrangement, and is intended to define an autonomous protected object.

This allows the customer of the connector manufacturer or of the appliance manufacturer to fit the FOTs with their surrounding housings directly on the desired circuit boards, and to solder them by means of reflow methods. One advantage, inter alia, results from the fact that the plastic fiber lengths are not subject to heat during soldering since they have not yet been fitted to the component group when the soldering is carried out.

The optical connector can be mounted on the circuit board in the same process step, likewise by being soldered in the case of a hybrid connector.

The blank cover is not removed until the soldering has been completed, and the fiber lengths are connected, and appropriately attached, on the one hand to the connector and on the other hand to the FOTs.

The integral blank cover, which is common to both FOTs, apart from this likewise carries out a double function. Firstly, it is used from production, through transportation to the soldering process, as effective protection against the sensitive connecting surfaces of the FOTs becoming dirty. Secondly, the plastic blank cover preferably has two centering beads on its rear face facing the FOTs, by means of which the FOTs are positioned correctly in the surrounding housing during the soldering process. This is because, in the unsoldered state, the FOTs have a certain amount of play in the surrounding housing, in order to make it possible to compensate for production tolerances. However, this play is lost during soldering since both the FOTs and the surrounding housing are soldered. The positioning or centering by means of the blank cover thus makes it possible to ensure that the fiber lengths with the double ferrule will later also be positioned exactly on the FOTs, and will be centered with respect to the optical connections.

The invention will be explained in more detail in the following text using exemplary embodiments and with reference to the drawings, in which identical and similar elements are in some cases provided with the same reference symbols, and the features of the various exemplary embodiments can be combined with one another.

DETAILED DESCRIPTION OF THE INVENTION

Figure 1:
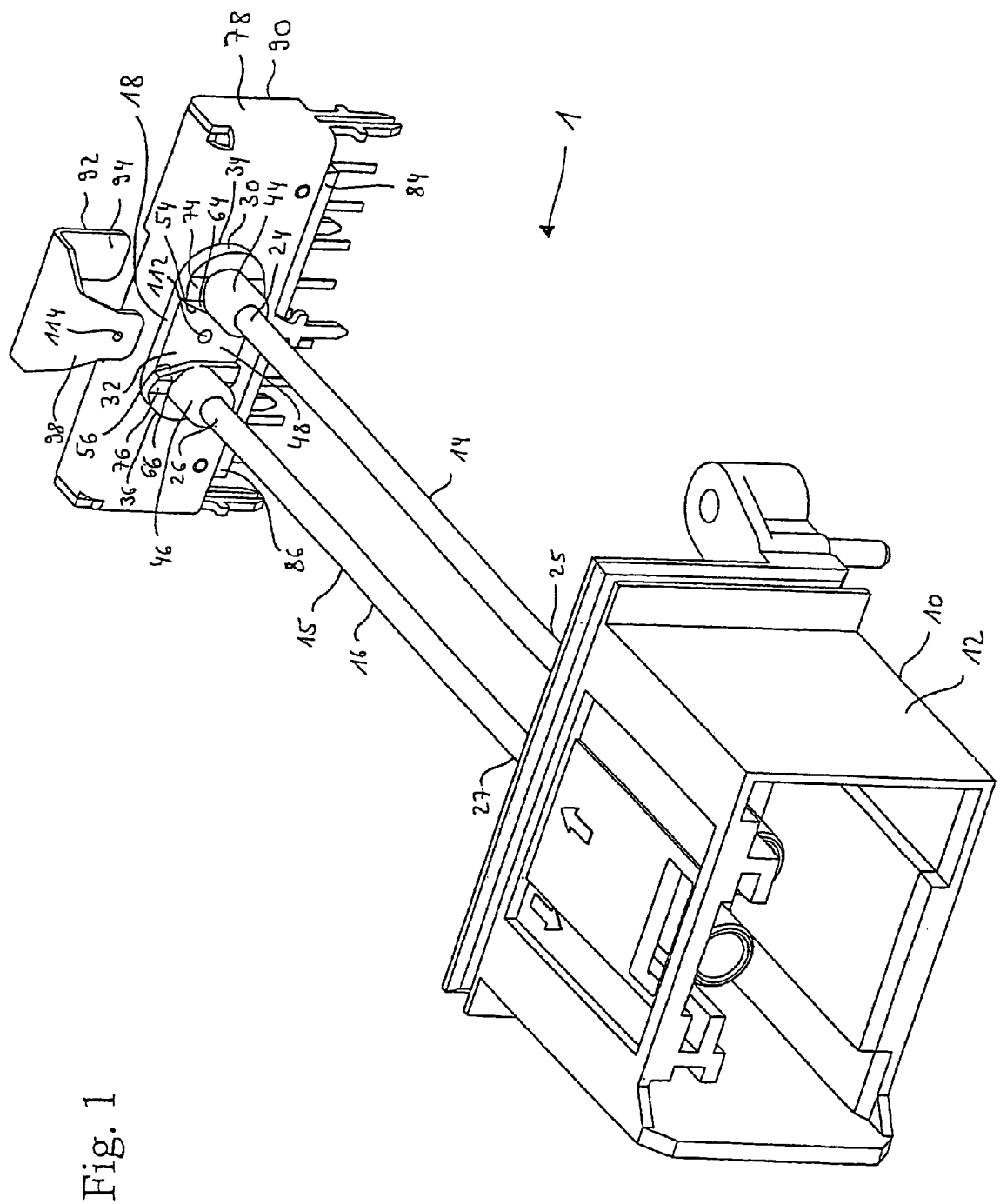
FIG. 1 shows a perspective view of a connector assembly according to the invention.

FIG. 1 illustrates an optical connector assembly 1 having an MOST® connector 10 comprising a dielectric connector housing 12 to which a first and a second optical fiber section 14, 16 are fitted at the rear. The MOST® connector 10 may be in the form of a pure optical connector, or a so-called hybrid connector with optical and electrical connections.

The fiber lengths 14, 16 typically have a length of a few centimeters. A fiber carrier 18 composed of plastic is fitted, to be more precise by being welded to the two fibers, to the rearward ends 24, 26 of the fiber lengths. The fiber carrier 18 is in the form of an integral double ferrule and has an elongated flat or plate-like body section 30, which is formed from a central connection section 32 and two semicircular opposite end sections 34 and 36. In the area of the semicircular end sections 34, 36, the two fiber lengths 14, 16 of the double ferrule has one cylindrical sleeve section 44, 46, which respectively surround the corresponding fiber in an annular shape, securing it and providing robustness for it. The sleeve sections 44, 46 extend along the longitudinal axis of the fibers and project a few millimeters out of the body section 30, thus providing kinking protection. The fiber lengths 14, 16 are detachably attached to the connector 10 at the rear by the respective ends 25 and 27.

Between the two fiber lengths 14, 16 and the respective sleeve sections 44, 46, the body section 30 has a somewhat reset guide groove 48, which is bounded laterally by two side walls 54, 56. In other words, the central connection section 32 forms the guide groove 48.

The two side walls 54, 56 are adjacent to two lateral surfaces 64, 66, which extend transversely with respect to the longitudinal axis and merge with a respective ramp surface 74 or 76, which falls away obliquely, into the semicircular sections 34 and 36, respectively.

Furthermore, the fiber carrier 18 also has a centered hole 112.

In FIG. 1, the fiber carrier 18 is connected to the metallic surrounding housing 78, but is not yet attached to it. The surrounding housing 78 surrounds two electrooptical transducers 84, 86 (which are in the form of so-called FOTs and are arranged alongside one another) from five sides.

Figure 2:
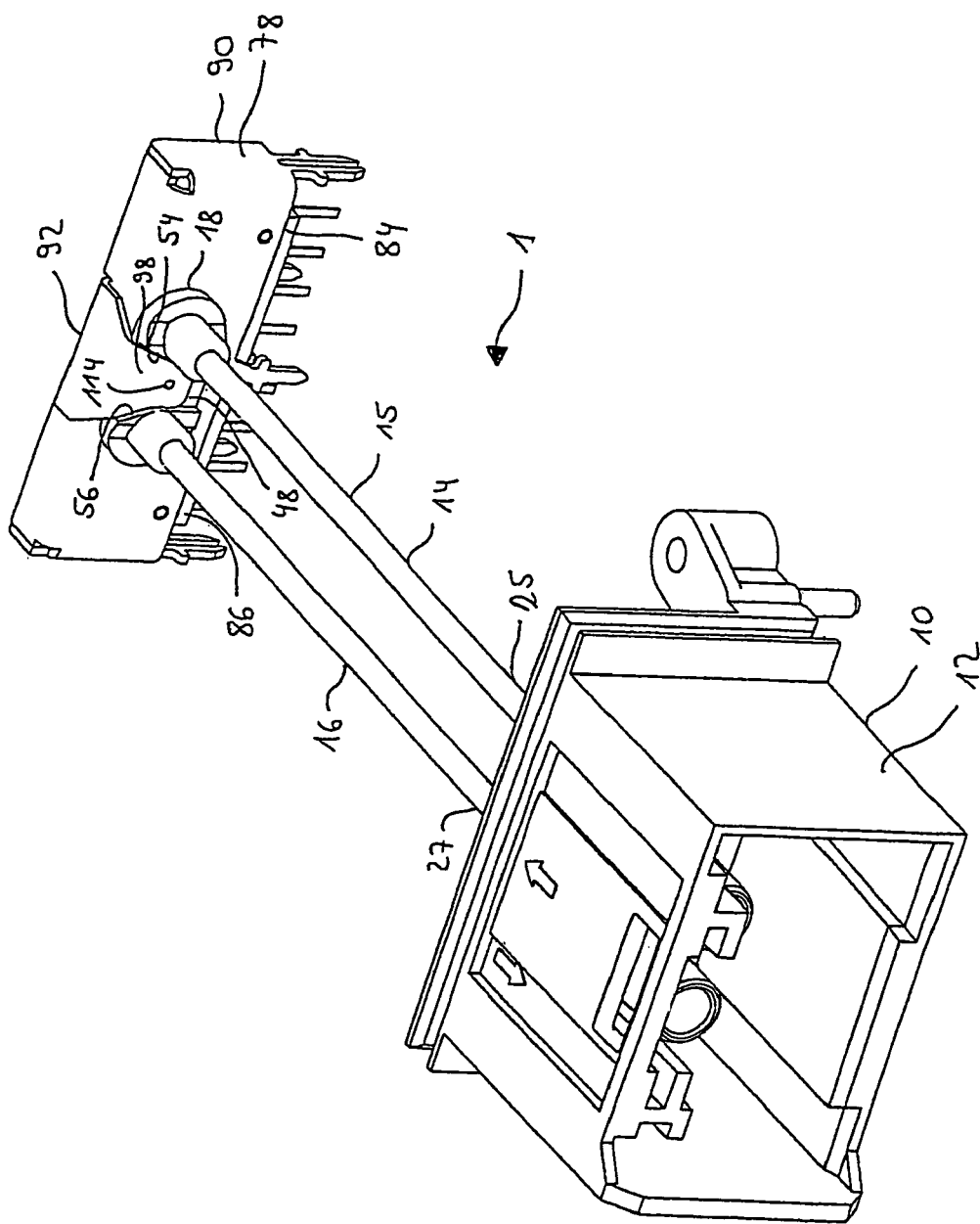
FIG. 2 shows the arrangement from FIG. 1 with a clip fitted.

FIG. 2 shows the connector assembly 1, comprising the optical connector 10, a fiber arrangement 15 which comprises the two optical fiber lengths 14, 16 and the fiber carrier 18, the FOT component group 90 and a clip 92, with the FOT component group 90 comprising the surrounding housing 78 and the two FOTs 84, 86. The clip 92 clasps the two FOTs 84, 86 and has a front limb 98 which rests in the guide groove 48 on the body section 30 of the integral fiber carrier 18, in order to apply force to it against the component group 90, and to attach it to the latter. In this state, in which the clip 92 is fitted to the surrounding housing 78, a projection 114 which points inwards on the first limb 98 of the clip 92 engages in the hole 112, so that the projection 114 and the hole 112 form latching means, which interact in a complementary manner.

Figure 3:
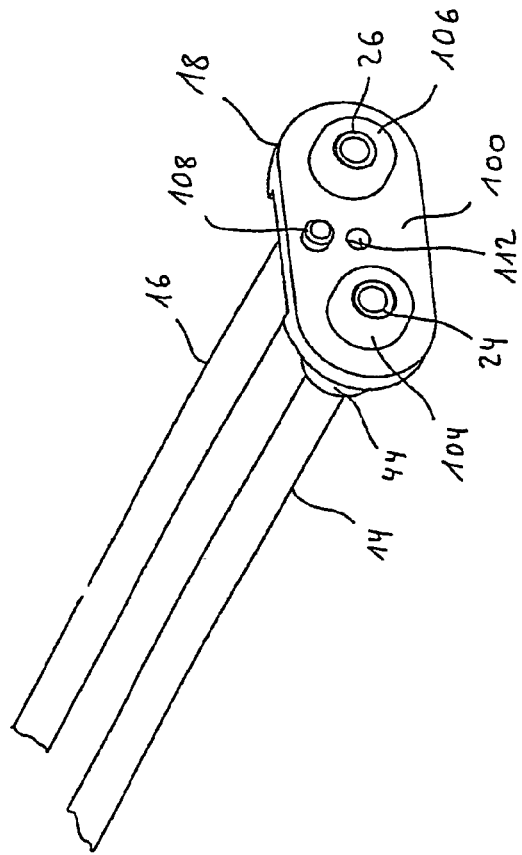
FIG. 3 shows a perspective view from the rear of a fiber arrangement.

FIG. 3 shows the rear face 100 of the fiber carrier 18, which rear face 100 forms a stop on the surrounding housing 78 when fitted. Two centering beads 104, 106 project from the rear face 100 and surround the associated rearward ends 24 and 26, respectively, of the respective fiber lengths 14 and 16 in an annular shape. In consequence, the rearward centering beads 104, 106 together with the front sleeve sections 44, 46 each form a ferrule for the optical fiber lengths 14 and 16, respectively.

The common fiber carrier 18 has a rotation protection means, which is offset vertically with respect to a connecting line between the two optical fiber lengths 14, 16, in the form of a rotation protection pin 108, which likewise projects from the rear face 100. The rotation protection pin 108 engages in an opening 110 in the surrounding housing 78, when fitted.

The centering beads 104, 106 have a rounded end in order to ensure easy insertion into openings 124 and 126, respectively, in the surrounding housing 78.

Figure 4:
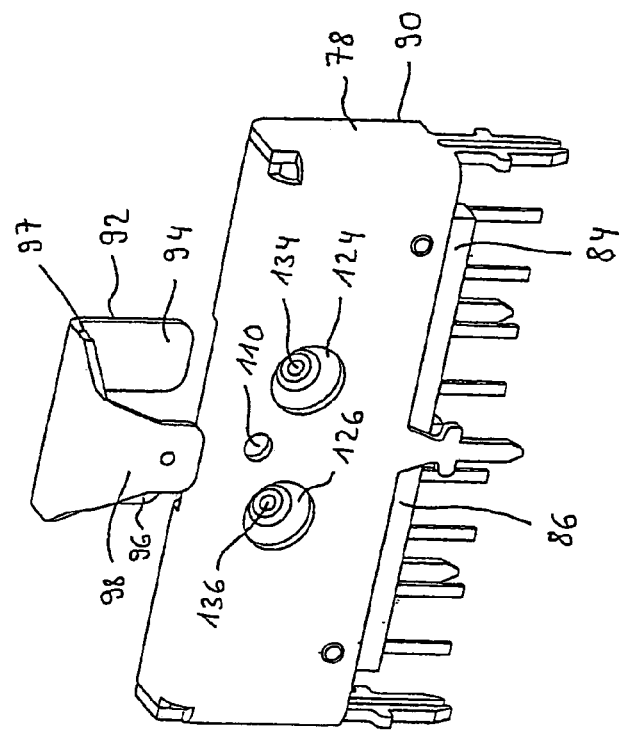
FIG. 4 shows a perspective view from the front of a component arrangement having two FOTs and a separate clip.

FIG. 4 shows how the openings 124, 126 keep clear optical terminals or ports 134 and 136, respectively, of the respective FOTs 84 and 86.

Figure 5:
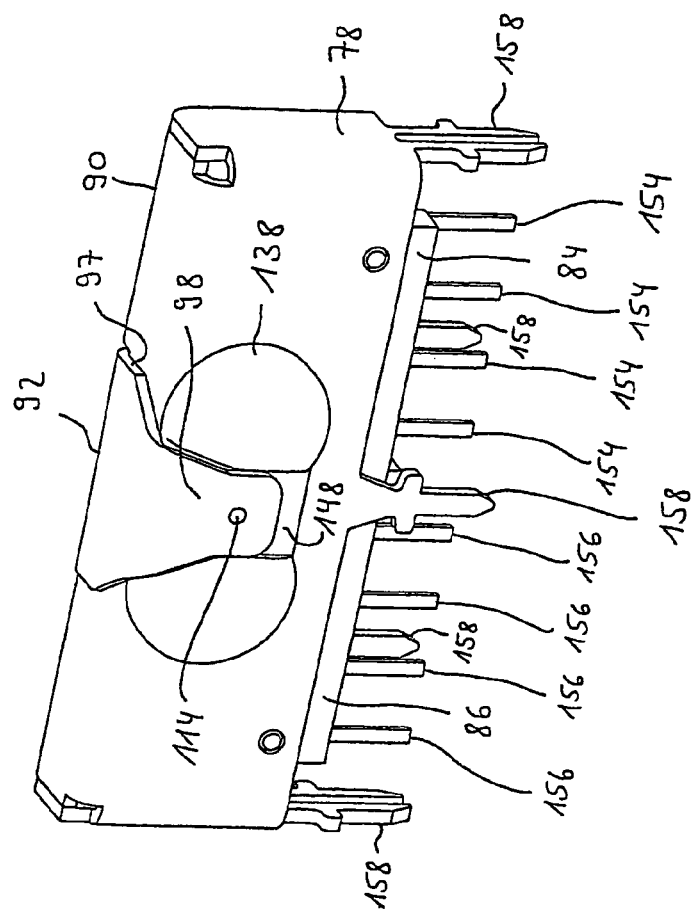
FIG. 5 shows the arrangement from FIG. 4 with a blank cover fitted.

FIG. 5 shows the component group 90 with a blank cover or blanking cap 138 fitted. The blanking cap 138 comprises two rounded end sections 144, 146 with a connection section 147 which is located between them and has a guide groove 148 which is shaped like the guide groove 48 but has no depression or hole for latching of the clip.

Thus, although the blanking cap 138 is attached by the same metal clip 92 as the fiber carrier 18, it can be pulled off again more easily because of the lack of the depression which is complementary to the projection 114.

Figure 6:
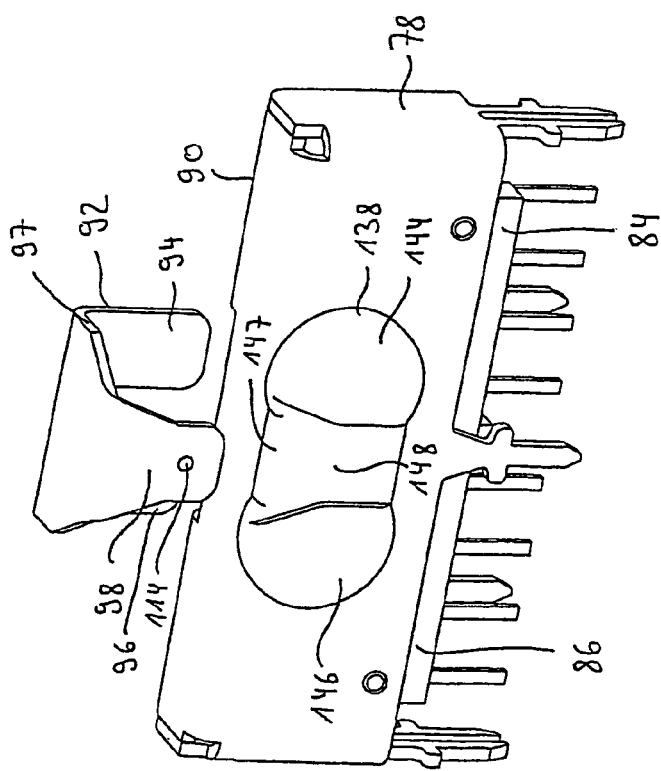
FIG. 6 shows the arrangement from FIG. 5 with a clip fitted.

This ensures particularly easy handling for the customer for the connection arrangement. The customer receives the component group 90 with the blanking cap 138 as well as the clip 92 fitted (as illustrated in FIG. 6). In this state, the component group 90 with the solder pins 154, 156 of the respective FOTs 84 and 86, and with the solder pins 158 of the surrounding housing 78, is inserted through corresponding openings in a circuit board (not illustrated), and is soldered by means of a reflow method. During fitting and soldering, the optical connections 134, 136 are effectively protected by the blanking cap 138 that has been fitted. Furthermore, the FOTs 84, 86 are positioned exactly by means of centering beads (not illustrated) on the rear face of the blanking cap 138 within the surrounding housing 78 during soldering, so that the optical terminals or ports 134, 136 are centered in the respective surrounding housing openings 124 and 126.

Figure 7:
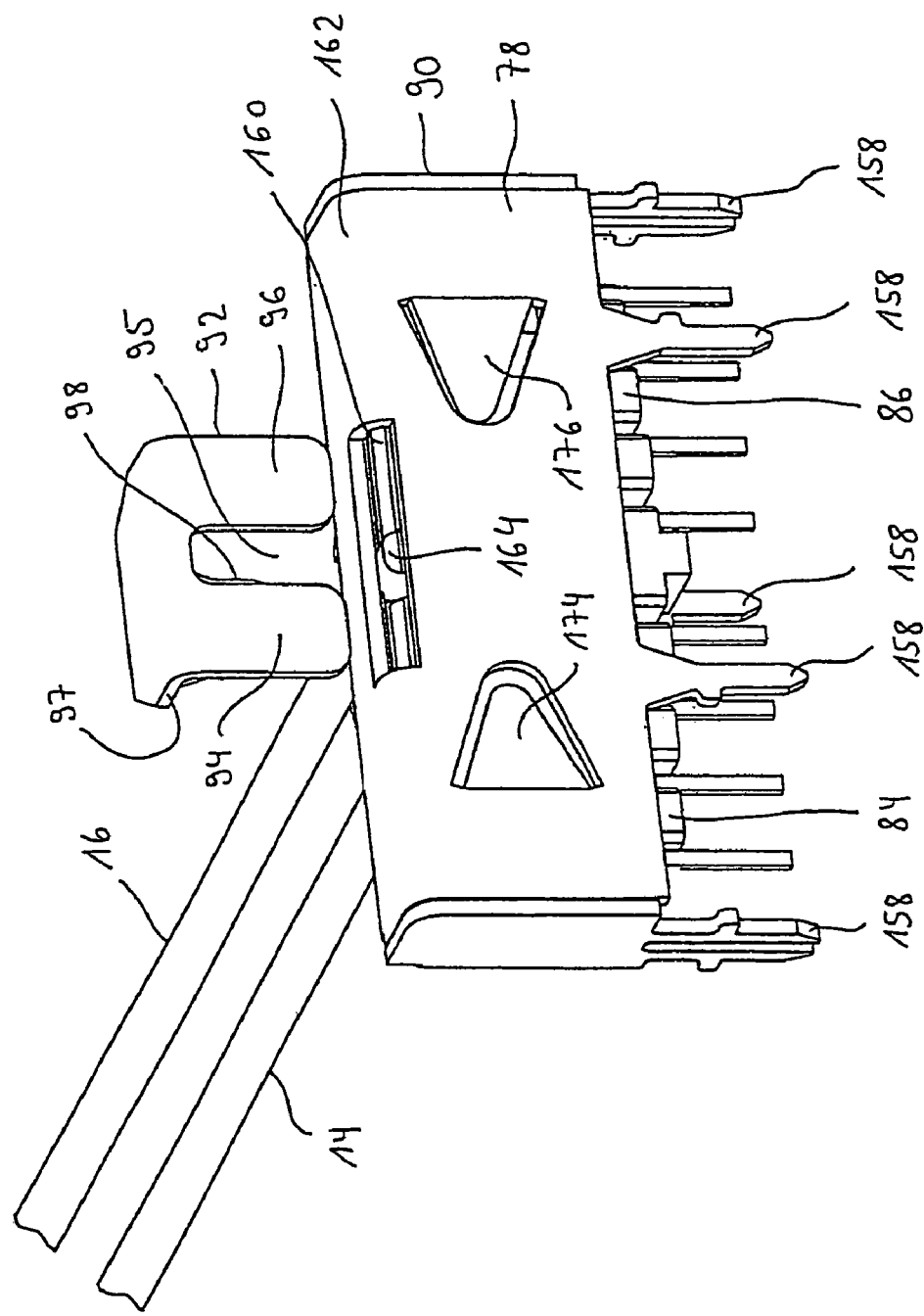
FIG. 7 shows a perspective view from the rear of the component arrangement with a fiber arrangement and a separate clip.

FIG. 7 shows the component group 90 with the clip 92 not fitted. The clip has a U-shaped cross section and has two limbs 94, 96 which are separated from one another laterally by a slot 95 which is located between them. The two rear limbs 94, 96 are integrally connected to the front limb 98 by an upper connection section 97.

The two rear limbs 94, 96 are inserted into a slot 160 on the rearward upper edge 162 of the surrounding housing 78. The clip is in this case guided and centered on its front face with the front limb 98 in the respective guide groove, and on its rear face by interaction of the slot 95 with a guide rail 164, which projects to the rear, within the surrounding housing and between the FOTs 84, 86. Furthermore, the surrounding housing 78 has two stamped-out contact-pressure leaf springs 174, 176, which are prestressed in the forward direction and apply force to the associated FOT 84 or 86, respectively, against the fiber lengths 14, 16.

Figure 8:
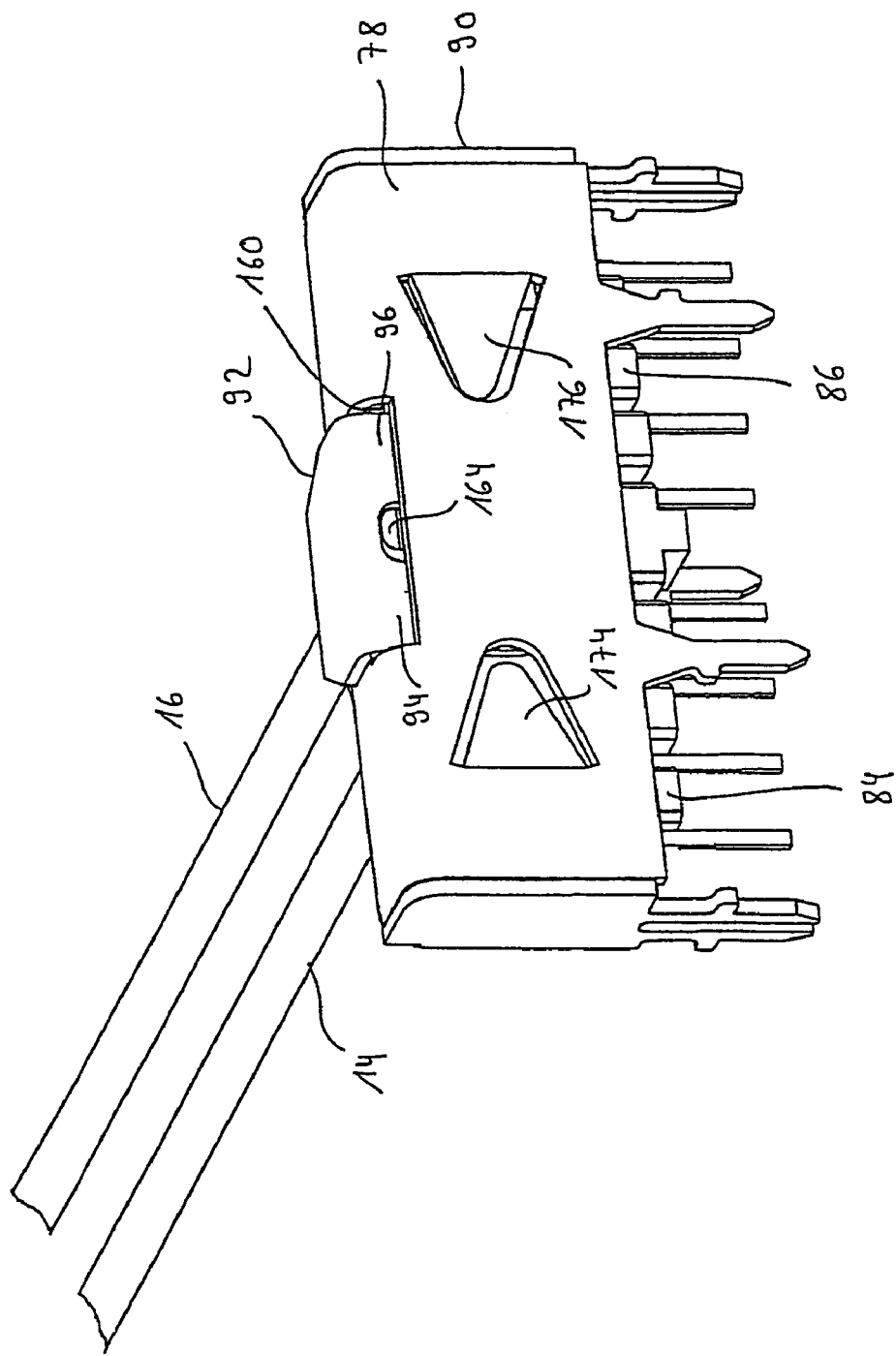
FIG. 8 is as FIG. 7, but with a clip fitted.

FIG. 8 shows the clip 92 in the fitted state, in which it is partially inserted into the surrounding housing 78.

Figure 9:
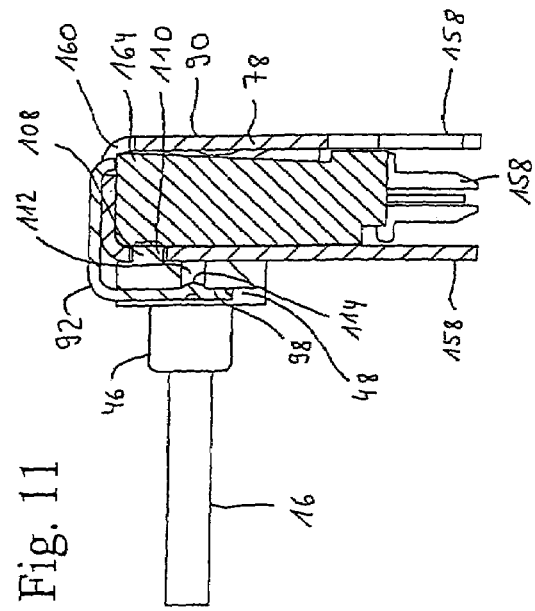
FIG. 9 shows a front view of the component arrangement with a fiber arrangement and a fitted clip.
Figure 10:
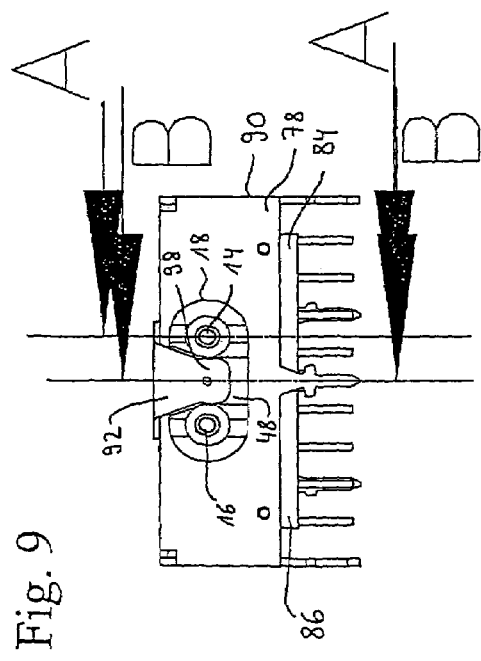
FIG. 10 shows a cross section along the line A-A in FIG. 9.
Figure 11:
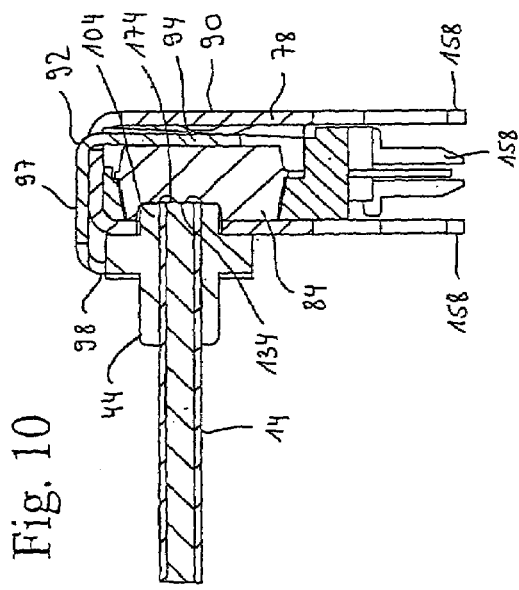
FIG. 11 shows a cross section along the section line B-B in FIG. 9.

FIGS. 9 to 11 show a front view and two sections through the component group 90. FIG. 10 shows how the rearward end surface 174 of the optical fiber 14 is pressed by means of the clip 92 directly against the optical connecting surface 134. These FOTs are embodiments which are supplied from the company Hamamatsu or Agilent. In these FOTs, the rear limbs 94, 96 come to rest directly on the rear face of the FOTs 84, 86.

FIG. 11 shows how the rotation protection pin 108 engages in the opening 110 in the surrounding housing 78.

Figure 14:
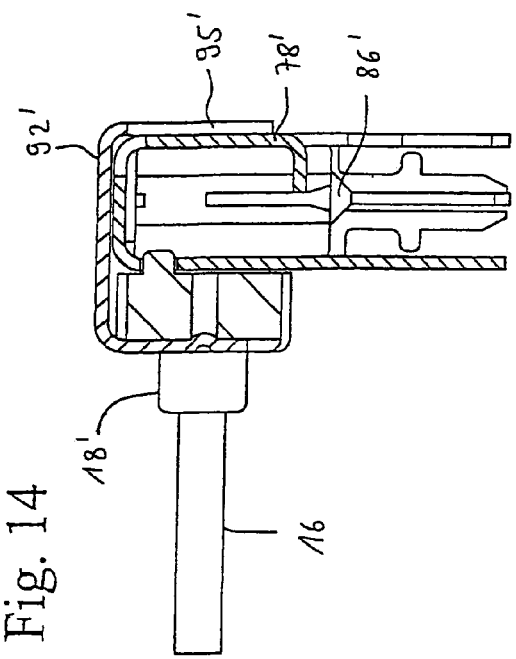
FIG. 14 shows a cross section along the section line D-D in FIG. 12.
Figure 12:
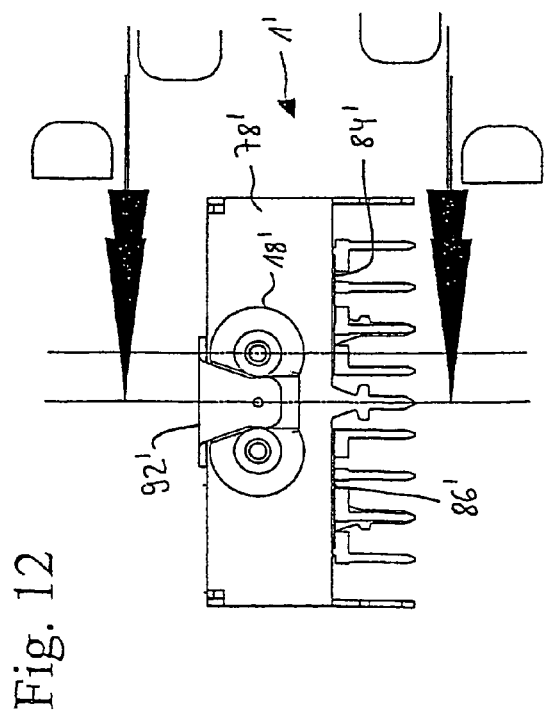
FIG. 12 shows a front view of a further embodiment of the component arrangement with a fiber arrangement and a clip.
Figure 13:
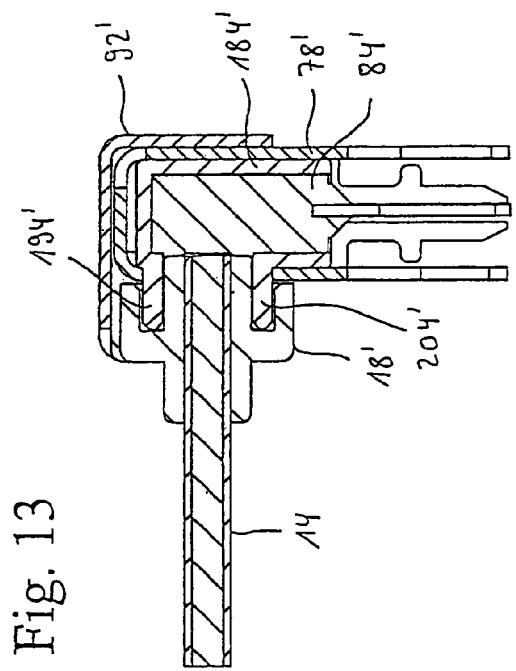
FIG. 13 shows a cross section along the line C-C in FIG. 12.

FIGS. 12 to 14 show a connector assembly 1' with alternative FOTs 84', 86', which are supplied by the company Infinion. In the Infinion FOTs, there is no space between the FOTs 84', 86' and the surrounding housing 78', so that the clip 92' comes to rest with the two rear limbs 94', 96' from the outside against the rear face of the surrounding housing 78'.

For this purpose, within the surrounding housing, the FOTs 84', 86' are each surrounded by a separate FOT holder 184', each of which have a projecting centering ring 194', on their front face which faces the fibers. For this purpose, the fiber carrier 18' has two annular recesses 204', for complementary interaction with the centering rings 194'.

As is evident to those skilled in the art, the embodiments described above should be understood as being examples and the invention is not restricted to them but can be varied in many ways without departing from the spirit of the invention.

The invention claimed is:

1. An optical connector assembly for establishing signal connections comprising:
   an optical connector to be connected to a complementary mating connector,
   a component assembly spaced from said optical connector and including at least one first electrooptical/optoelectrical transducer and one second electroopitcal/optoelectrical transducer,
   at least a first optical fiber length and a second optical fiber length, each having a first end connected to said optical connector and a second end connected to a respective one of said first and second transducers, wherein a first optical signal connection is established by said first fiber length between said optical connector and said first transducer, and a second optical signal connection is established by said second fiber length between said optical connector and said second transducer, when said first and second fiber lengths are connected to said first and second transducers, respectively on the one hand, and to said optical connector on the other hand, at least one fixing means for detachable attaching both of said fiber lengths to said component assembly, and an integrally formed double ferrule common fiber carrier for holding both fiber lengths between said optical connector and said spaced component assembly and permanently fixing said second ends of said first and second fiber lengths, wherein by cooperation of said fixing means with said common fiber carrier both of said fiber lengths are releasably secured to said component assembly.

2. The optical connector assembly of claim 1, wherein said fixing means is in a form of a single attachment means for detachably attaching said common fiber carrier onto said component assembly.

3. The optical connector assembly of claim 1, wherein said common fiber carrier includes a pin projecting from a rear face thereof offset vertically with respect to a connecting line between the two optical fiber lengths for receipt within an opening formed in a surrounding housing of said component group.

4. The optical connector assembly of claim 1, wherein said common fiber carrier is one of bonded or welded or unitarily overmolded to both of said fiber lengths.

5. An optical connector assembly for establishing signal connections comprising:

an optical connector to be connected to a complementary mating connector, a component assembly spaced from said optical connector and including at least one first electrooptical/optoelectrical transducer and one second electrooptical/optoelectrical transducer, at least a first optical fiber length and a second optical fiber length, each having a first end connected to said optical connector and a second end conneted to a respective one of said first and second transducers, wherein a first optical signal connection is established by said first fiber length between said optical connector and said first transducer, and a second optical signal connection is established by said second fiber length between said optical connector and said second transducer, when said first and second fiber lengths are connected to said first and second transducers, respectively, on the one hand, and to said optical connector on the other hand, at least one fixing means for detachable attaching both of said fiber lengths to said component assembly, and a common fiber carrier for holding both fiber lengths between said optical connector and said spaced component assembly and fixing said second ends of said fiber lengths, said common fiber carrier comprising a first and a second ferrule portion encompassing said first and second fiber lengths, respectively, and a body portion having a front face for fixing said second ends of said fiber lengths and a rear face engaging said component assembly, wherein by cooperation of said fixing means with said common fiber carrier both of said fiber lengths are releasably secured to said component assembly.

6. The optical connector assembly of claim 5, wherein said body portion is of a flat shape and defines a plane transverse with respect to said fiber lengths, and wherein said ferrule portions project from said front face and from said rear face of said body portion.

7. The optical connector assembly of claim 1, wherein said fixing means is in the form of a resilient clip having a front leg, a rear leg and a joining portion.

8. The optical connector assembly of claim 7, wherein said clip has a substantially U-shaped cross section so as to encompass said transducers and said common fiber carrier, and to bias said second ends of said fiber lengths towards both of said transducers.

9. The optical connector assembly of claim 8, wherein both of said transducers are disposed within a common enclosure and wherein said clip, in a mounted condition thereof, is in engagement with said enclosure.

10. The optical connector assembly of claim 7, wherein said clip comprises at least one front leg, a first rear leg portion and a second rear leg portion laterally separated by an intervening slot, and an upper joining portion joining said front leg with said pair of rear leg portions.

11. The optical connector assembly of claim 10, wherein a common enclosure is provided for housing said transducers and has an opening for passing said rear legs which directly engage said transducers.

12. The optical connector assembly of claim 7, wherein said front leg, in a mounted condition thereof, engages said common fiber carrier.

13. The optical connector assembly of claim 12, wherein said fiber carrier includes a guiding groove in said body portion provided between said fiber lengths which is bounded by two side walls and is adapted for insertion of said front leg of said clip.

14. The optical connector assembly of claim 13, wherein said guiding groove and said front leg comprise a common taper.

15. The optical connector assembly of claim 7, wherein said clip is unitarily stamped and formed from sheet metal.

16. The optical connector assembly of claim 7, wherein said clip and said fiber carrier comprise complementary interengaging latching means.

17. A method for assembling and soldering an optical connector assembly to a circuit board, the connector assembly including a first and a second electrooptical/optoelectrical transducer, an optical connector and a first optical fiber length and a second optical fiber length, and is for a spaced connection of said transducers to said connector, the method comprising the steps of:

providing said optical connector which is adapted to be connected to a complementary mating connector, providing a component assembly mountable at a distance from said optical connector and including said first and second transducers which have first and second optical ports, respectively, and a plurality of solder contacts, providing at least one fixing means, providing a blank cover releasably secured to said component assembly by said fixing means such that said first and second optical ports are closed by said blank cover, providing said first and second optical fiber lengths each having a first end to be connected to said optical connector and a second end to be connected to said first and second transducers, respectively, and having a common fiber carrier for both fiber lengths at each of the second ends thereof, mounting said connector onto said circuit board, mounting said assembly comprising said component assembly, said blank cover and said fixing means onto said circuit board and soldering said solder contacts to conductors on said circuit board, detaching said fixing means and removing said blank cover, connecting said first and second optical fiber lengths by their respective first ends to said optical connector on the one hand and by their respective second ends to said component assembly on the other hand, wherein a first optical signal connection between said optical connector and said first transducer by said first fiber length and a second optical signal connection between said optical connector and said second transducer by said second fiber length are established, securing said common fiber carrier to said component assembly, and securing said first and second optical fiber lengths to said optical connector.

18. The method of claim 17, wherein said optical connector is in a form of a hybrid connector having optical and electrical ports and including a plurality of electrical solder contacts that are soldered to the conductors on said circuit board in the same processing step as said solder contacts of said component assembly.

19. The method of claim 18, wherein soldering of said solder contacts is carried out by reflow soldering.

20. The method of claim 17, wherein said common fiber carrier is attached to said component assembly by that fixing means by means of which said blank cover was previously attached.

21. A mounting arrangement for assembling an optical connector assembly and for mounting and soldering same to a circuit board, comprising:

a component assembly including a first and a second electrooptical/optoelectrical transducer being arranged within a common enclosure, and having first and second optical ports, respectively, and a first and a second pig-tail for optically connecting said first and second transducers to an optical connector, an optical connector which is mounted on a circuit board spaced from said component assembly, a blank cover for covering and protecting said first and second optical ports, and clip means for releasably securing said blank cover to said component assembly.

* * * * *